G. E. HAZARD.
VALVE CONSTRUCTION.
APPLICATION FILED APR. 14, 1921.
1,423,323.
Patented July 18, 1922.
2 SHEETS—SHEET 1.
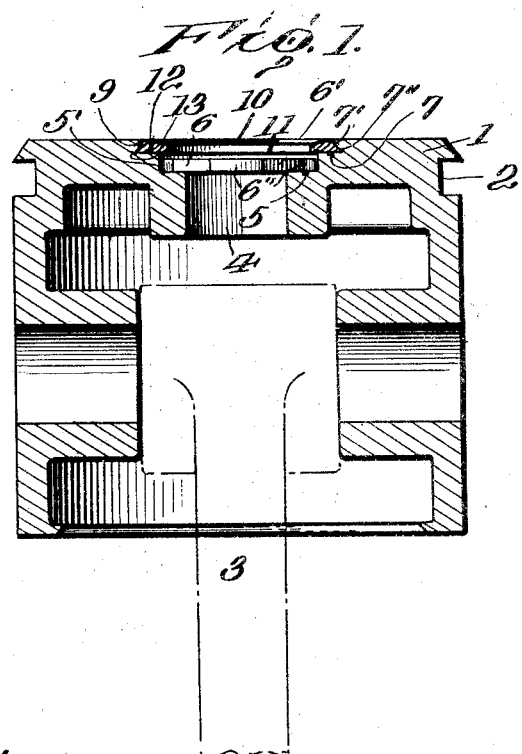
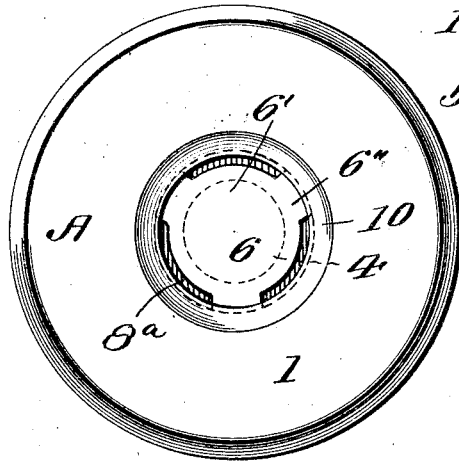
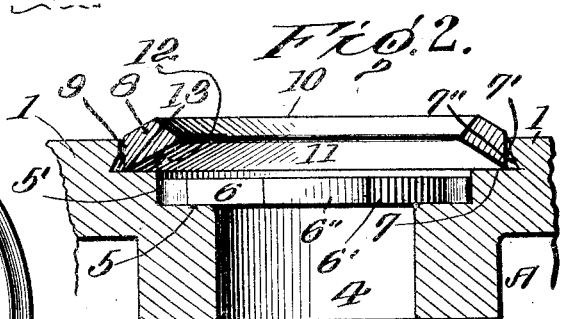
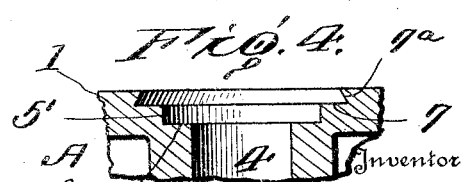
George E. Hazard,
Inventor
By A. S. Pattison
Attorney

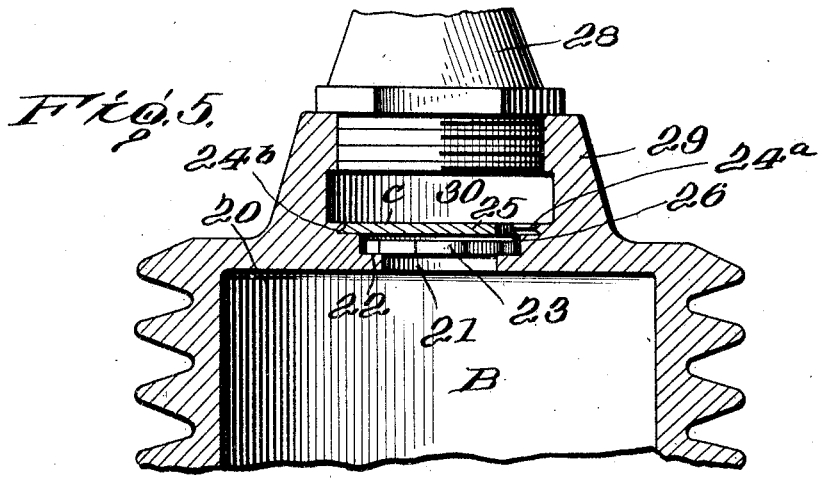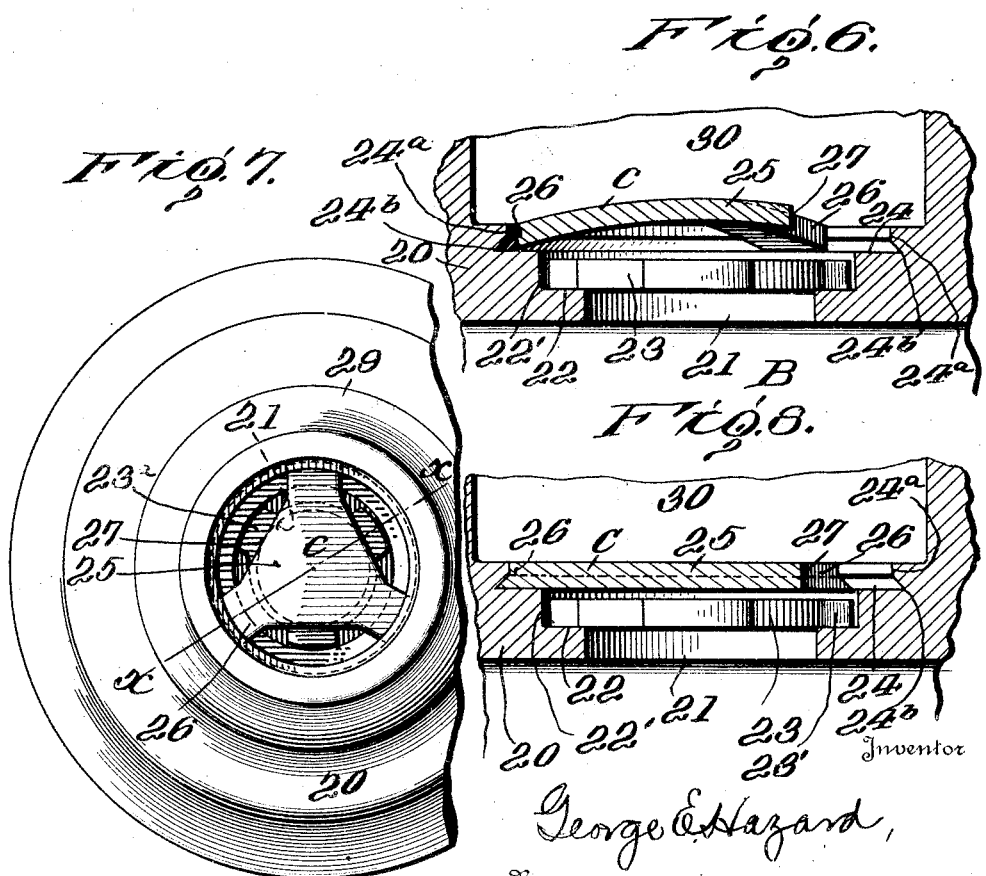

UNITED STATES PATENT OFFICE.

GEORGE EDGAR HAZARD, OF ROCHESTER, NEW YORK, ASSIGNOR TO KELLOGG MANUFACTURING CO., OF ROCHESTER, NEW YORK.

VALVE CONSTRUCTION.

1,423,323.   Specification of Letters Patent.   Patented July 18, 1922.

Application filed April 14, 1921. Serial No. 461,323.

*To all whom it may concern:*

Be it known that I, GEORGE E. HAZARD, a citizen of the United States, residing at Rochester, in the county of Monroe and State of New York, have invented certain new and useful Improvements in Valve Constructions, of which the following is a specification, reference being had therein to the accompanying drawing.

This invention relates to improvements in valve constructions, which are more particularly intended for use in air pumps, especially air pumps operated by automobiles to inflate tires.

The object of the invention is to provide a novel valve construction comprising a light, flat disk valve and a retaining washer or ring for retaining the valve in position and limiting its movement, whereby quietness of operation and quick action is obtained.

Another object of the invention is to provide a valve construction which is cheap of manufacture in that the valve and retaining member can be stamped out rapidly on a press as compared with the turning of a puppet valve with its stem and valve portion from bar stock.

A further object of the invention is to provide a valve construction which makes it unnecessary to grind the valve to its seat, which is absolutely necessary with the puppet cone valve to get the proper seating thereof.

Further objects of the invention will appear from the following description and disclosure.

In the accompanying drawings:

Figure 1 is a vertical sectional view of a piston having in its head the improved valve construction of this invention.

Fig. 2 is an enlarged sectional view of the valve construction, the retaining ring being shown as it appears before being expanded into its assembled position.

Fig. 3 is a top plan view of a piston head provided with the improved valve construction of this invention.

Fig. 4 is an enlarged vertical sectional view showing a modification in construction of the wall surrounding the retaining ring flange.

Fig. 5 is a vertical sectional view of a cylinder having in its head a modified form of the improved valve construction of this invention.

Fig. 6 is an enlarged sectional view of the cylinder head valve construction, the modified form of valve retaining member being shown as it appears before being expanded into its assembled position.

Fig. 7 is a top plan view of a piston head provided with the modified form of the improved valve construction of this invention.

Fig. 8 is an enlarged sectional view of the cylinder head valve construction, the modified form of valve retaining member being shown as it appears after having been expanded into its operating position.

Referring now to the drawings in which like parts are designated by similar reference numerals, A represents a piston having a head 1, and the usual groove 2, and connecting rod 3.

The embodiment of the invention is here shown as applied to the head of a piston, but I wish it to be understood; and it can be readily seen, that my improved valve construction is not limited to this use, as it can be used in cylinder heads, or the like, or in many other places where the use of a valve is necessary.

The piston head 1 is provided with a central air outlet-opening 4, having therein a flange 5, which forms a flat valve seat for the flat disk valve 6. This disk valve 6 has an imperforate central flat portion 6', of a larger area than the outlet-opening 4, whereby the periphery of the central imperforate portion seats on the inner edge of the flange 5. The surrounding wall 5' of the flange 5 forms a retaining flange for the engagement of the outer edge of a plurality of laterally extending flat arms 6", formed integral with the imperforate portion 6' of the valve 6.

The flange 7 is cut in the piston head and is located above the flange 5, being greater in circumference than this flange and having a surrounding wall with a vertical portion 7', and a beveled or grooved portion 7". The flange 7 forms a seat for the valve retaining ring or member 8, which limits the movement of the valve 6 and has an opening 8ª therein which is larger than the imperforate central portion 6' of the valve 6.

Particular attention is called to the shape and formation of the ring member 8. This ring has a vertical outer edge 9, a beveled upper face 10, a beveled inner face 11, and a beveled bottom 12, as shown in Fig. 3. It will be noted that when the ring is placed upon the outer flange 7, it rests upon the edge 13, which is the meeting edge of the bottom 12 and the vertical outer edge 9 and the member also extends above the face of the piston head 1.

Two other features of my improved construction are also brought to attention at this time. The circumference of the inner flange 5 is less than that of the flange 7, but when the ring member 8 is upon its seat, the faces thereof extend over and above the valve arms 6″ of the valve. In my construction the flat valve 6 is made of less thickness than the depth of the wall surrounding its seat.

To assemble my structure, the flat valve 6 is placed upon the inner flange 5, its portion 6′ completely covering and closing the outlet opening 4, in the piston head. The ring member 8 is then placed upon its seat 7, as shown in Fig. 3, and force is applied to its upper face 10 in any suitable manner. The parts will now assume, by expansion, the positions shown in Fig. 1, the bottom 12 of the retaining ring being in a horizontal plane or straight line and expanded outwardly into the groove 7″ surrounding its flange seat 7, while the top of the ring is now flush with the face of the piston head 1. Due to the expansion of the ring into the groove 7″, it is locked firmly in position upon its seat with its lower face 11 extended above and over the arms 6″ of the valve 6.

In Fig. 4, I have shown a modified form of the manner of beveling the surrounding wall of the outer flange. In this view, A represents the piston, and 1 the piston head, having therein the opening 4. The inner flange 5 and its surrounding wall 5′ are constructed in a similar manner as the corresponding flange in the preferred construction. The outer flange 7 which receives the retaining member 8 has a surrounding wall 7ª which is beveled its complete depth, as shown, forming an acute angle at its base with the flange. The retaining member is expanded and locked in the flange in this construction in like manner as described in the preferred form.

In operation, when the piston A travels down, the valve 6 is unseated and air flows around the valve and through the opening 8ª, the upward movement of the valve being limited by the ring 8, the face 12 of which engages the arms 6″ of the valve when it rises from its seat. When the piston starts its upward stroke the valve drops back upon the flange 5, thus closing the piston head air-outlet opening 4.

A valve construction as described above not only gives the top of the piston a smooth and finished appearance, but also provides a valve which does not have to be ground into its seat. Quietness and quick action are also attributes of my improved valve due to the limited movement of the valve from an open to closed position.

Referring now to the modified form of my invention, Figs. 5 to 8 inclusive, which show the valve construction as it is applied to a cylinder head, B represents the usual type of cylinder having a head 20, which is provided with an air outlet passage or opening 21.

The construction of the flange 22, the valve 23, the flange 24 and the flange walls 22ª and 24ª are the same as the preferred form. The difference in this modification lies solely in the retaining member or spider C, and this difference and its advantages will now be described.

In applying my improved valve construction in places where there is a limited amount of space or room, it is sometimes impossible to use a ring retainer, such as shown and described in the preferred form herein, with sufficient cross-sectional width to hold it firmly locked in position after it has been expanded. To meet and overcome this difficulty, I have provided the modified form of valve retaining member or spider C.

The retaining spider C is of approximately the same shape in plan as the flat valve 23, but before being assembled is curved in cross-section, having the central imperforate portion 25 with outwardly extending portions or arms 26 between which are the air passages 27.

This modified form is assembled in much the same manner as the preferred form. The disk valve 23 is placed on the flange seat 22 and the spider C is placed upon the seat 24, as clearly shown in Fig. 6. Pressure is then applied to the curved spider and it is flattened and expanded, its arms 26 entering the groove 24ᵇ in the flange wall 24ª which surrounds the spider seat 24, as shown in Figs. 7 and 8. When the spider is completely flattened or expanded its arms 26 lock it in position upon its flange seat 24.

In operation, when air is compressed in the cylinder B, the pressure lifts the flat disk valve 23 whose upward movement is limited by the spider C above it. The compressed air escapes around the arms 23ª of the valve and through the air passages 27 and upwardly past the arms 26 of the spider.

To convey the compressed air to the tank (not shown) I have provided a pipe 28, which makes suitable connection in the extension 29 of the cylinder head 20. This extension 29 has an air outlet opening 30, which is in communication with the air outlet opening 21 of the cylinder through the medium of the flat valve 23. It will be understood that the back pressure in the pipe 28 will normally hold the flat disk valve 23 closed and that this valve is lifted only when compression of air takes place in the cylinder. However, if desired, a check valve can be used in the pipe 28, between its connection to the cylinder head and the tank, as the disk valve 23 will of its own weight normally rest upon its seat 22 and the downward stroke of a piston in the cylinder B will tend to seat it more tightly.

Having thus described my invention, what I claim and desire to secure by Letters Patent is:—

1. An improved valve construction, comprising a body provided with an opening surrounded by inner and outer flanges, a flat valve carried upon the inner flange, and a valve retaining member expanded between the outer flange and its surrounding wall for the purpose described.

2. An improved valve construction, comprising a body provided with an opening, inner and outer flanges surrounding the opening, a flat disk valve having an imperforate portion of greater area than the opening and carried upon the inner flange, and a valve retaining member expanded between the outer flange and its surrounding wall, for the purpose described.

3. An improved valve construction, comprising a body provided with an opening, inner and outer flanges surrounding the opening, a flat disk valve carried upon the inner flange, and a valve retaining ring member expanded between the outer flange and its surrounding wall, for the purpose described.

4. An improved valve construction, comprising a body provided with an opening, inner and outer flanges surrounding the opening, surrounding walls for the flanges, the surrounding wall of the outer flange beveled to form a groove at its base, a flat valve carried upon the inner flange, and a valve retaining ring member expanded into the surrounding groove of the outer flange, for the purpose described.

5. An improved valve construction comprising a body provided with an opening, inner and outer flanges having surrounding walls surrounding the opening, a flat valve carried upon the inner flange, the surrounding wall of the outer flange beveled to form an acute angle with the flange, and a valve retaining member expanded into the acute angular space, for the purpose described.

6. An improved valve construction comprising a body provided with an opening, inner and outer flanges surrounding the opening, a flat valve carried upon the inner flange and adapted to close the opening, and a valve retaining ring member greater in width than the outer flange expanded between the outer flange and its surrounding wall and extending beyond the inner edge of the flange, for the purpose described.

7. An improved valve construction comprising a body provided with an opening, inner and outer flanges surrounding the opening, surrounding walls for the flanges, the surrounding wall of the outer flange beveled to form an acute angle with the flange, a flat valve carried upon the inner flange, and a valve retaining ring member greater in width than the outer flange expanded into the groove formed by the beveled wall surrounding the outer flange and extending beyond the inner edge of the said flange, for the purpose described.

8. An improved valve construction, comprising a body provided with an opening, inner and outer flanges surrounding the opening, surrounding walls for the flanges, a flat disk valve carried upon the inner flange, the valve less in thickness than the depth of the flange surrounded wall and having an imperforate portion greater in area than the opening, and a valve retaining ring member greater in width than the outer flange expanded between the outer flange and its surrounding wall and extending beyond the inner edge of the flange for the purpose described.

9. An improved valve construction comprising a body having an opening surrounded by inner and outer flanges provided with surrounding walls, the surrounding wall of the outer flange beveled to form an acute angle with the flange, a flat valve carried upon the inner flange, a valve retaining ring member expanded into the groove formed by the beveled wall surrounding the outer flange, the retaining member having its upper face less in width than its lower face, the width of the retaining member greater than its flange seat and extending beyond the inner edge of the flange, as and for the purpose described.

In testimony whereof I hereunto affix my signature.

GEORGE EDGAR HAZARD.